(No Model.) 3 Sheets—Sheet 3.
M. BURKE.
SULKY CULTIVATOR.
No. 458,217. Patented Aug. 25, 1891.
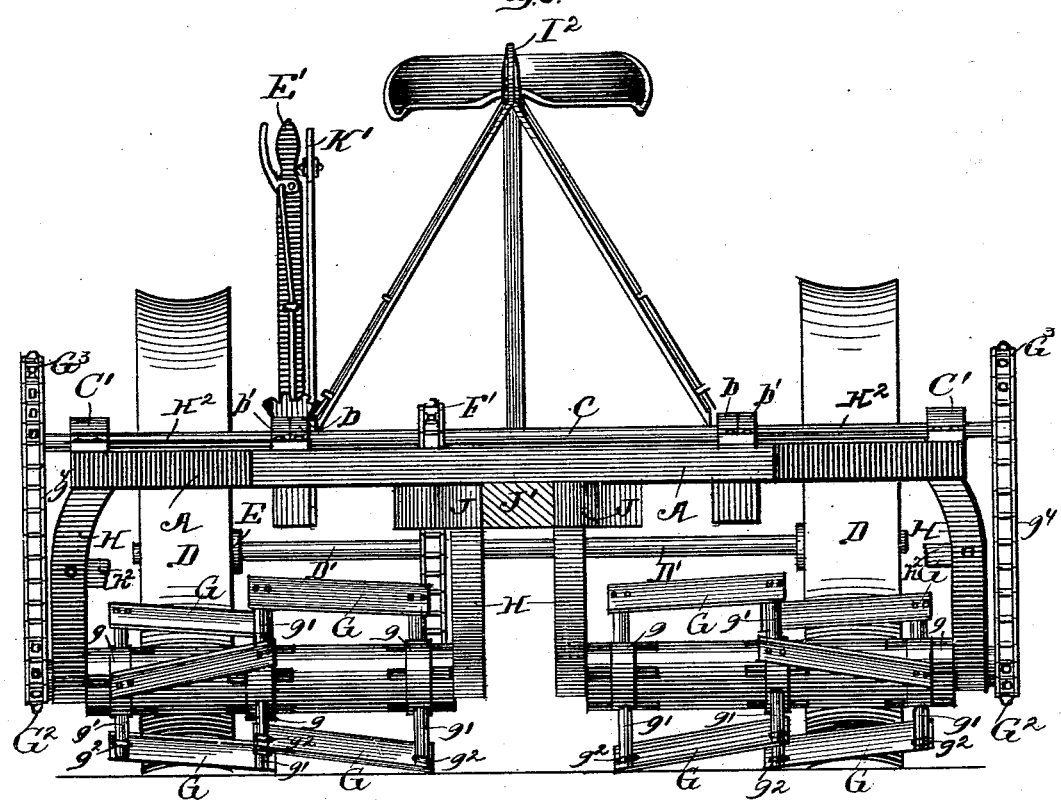
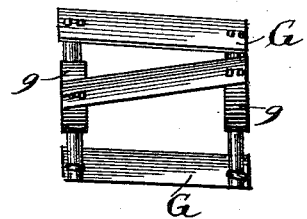
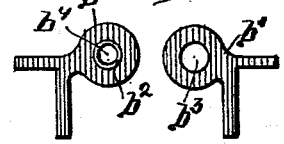
Witnesses:
Luti S. Alter
Michael Carter
Inventor,
Matthew Burke,
By Charles J. Brown,
Atty.

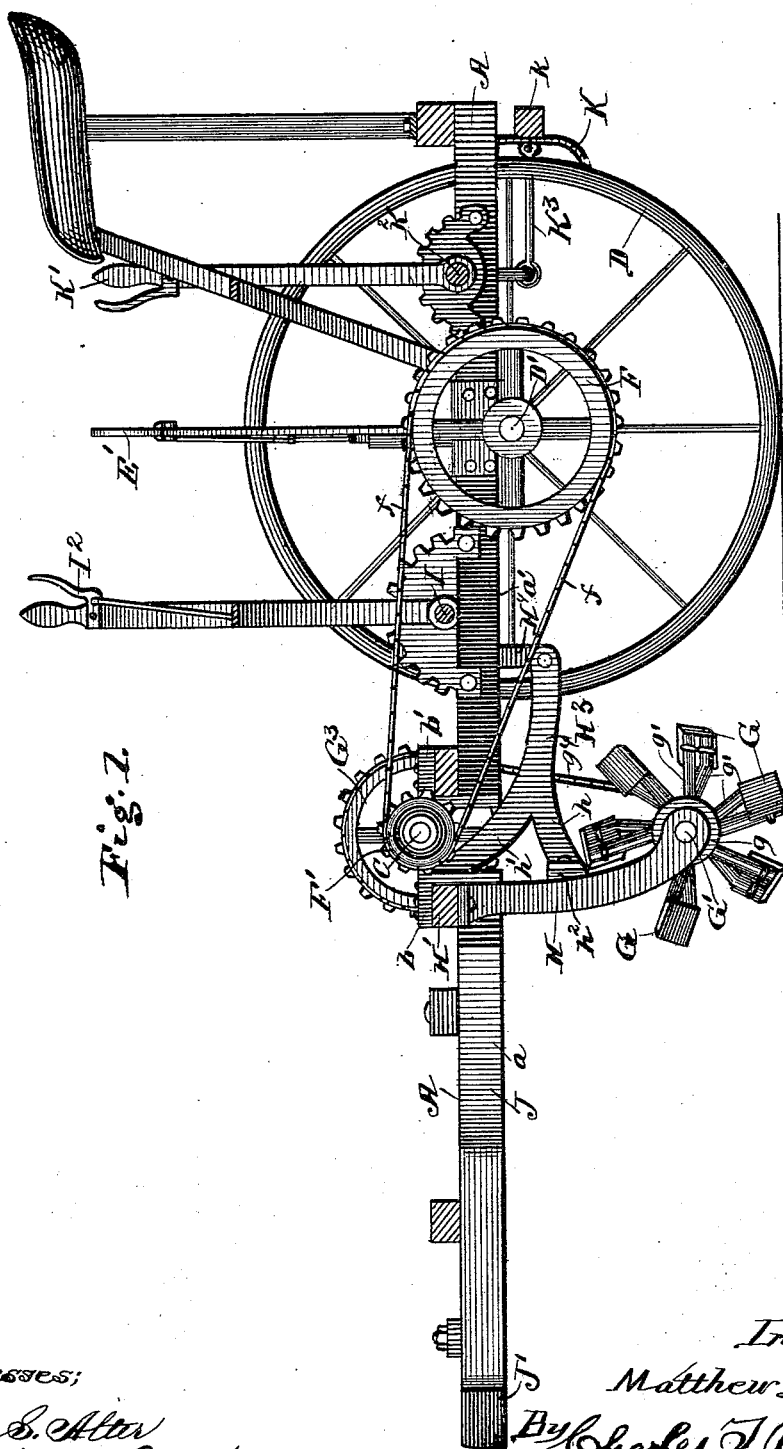

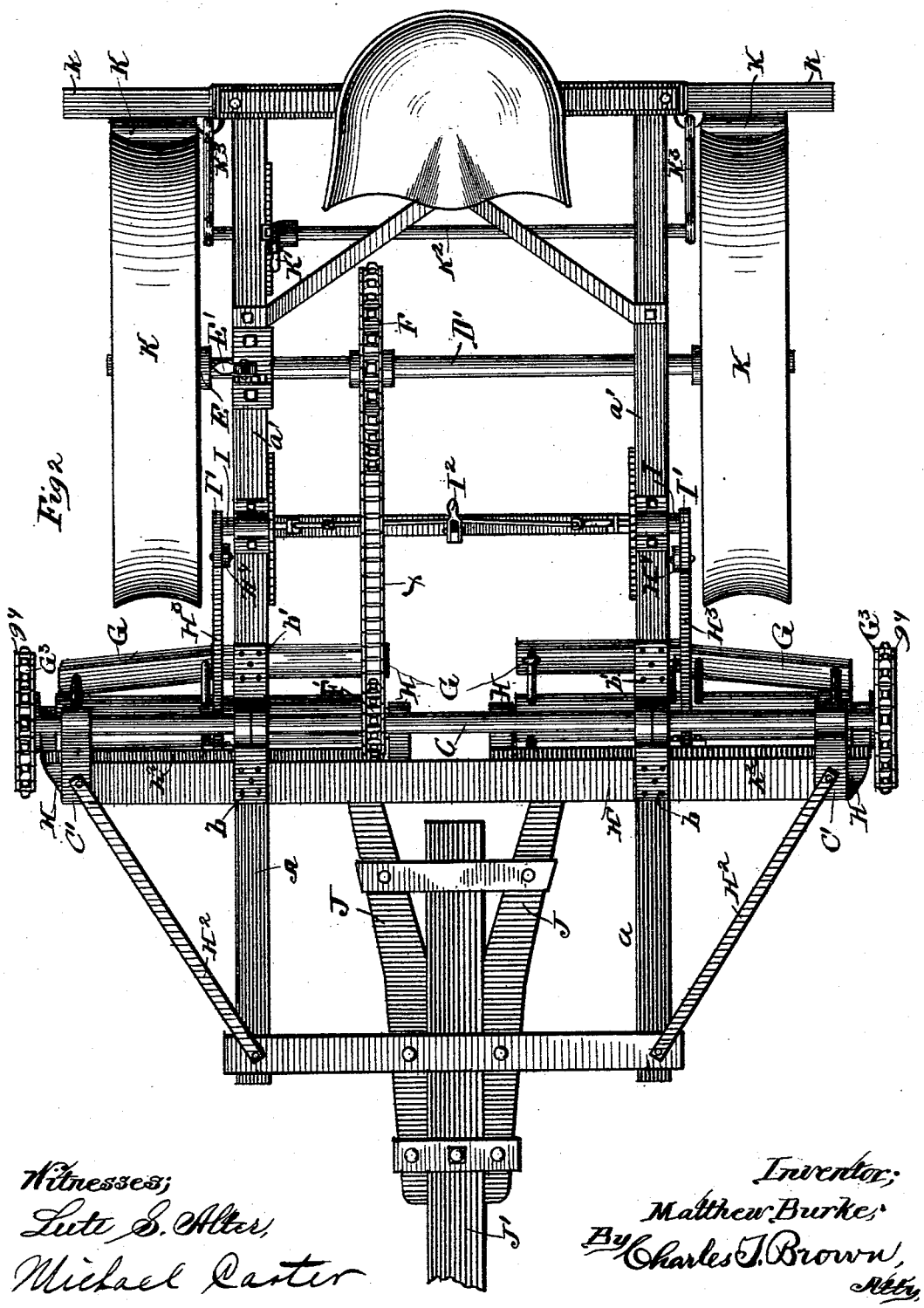

UNITED STATES PATENT OFFICE.

MATTHEW BURKE, OF CHICAGO, ILLINOIS.

SULKY-CULTIVATOR.

SPECIFICATION forming part of Letters Patent No. 458,217, dated August 25, 1891.

Application filed April 30, 1891. Serial No. 391,098. (No model.)

*To all whom it may concern:*

Be it known that I, MATTHEW BURKE, residing at Chicago, in the county of Cook and State of Illinois, have invented certain new and useful Improvements in Sulky-Cultivators, of which the following is a specification.

My invention relates to that class of cultivators mounted upon sulky-frames—that is, frames supported by wheels turning on an axle and adapted to be drawn by a team.

The object of my invention is to obtain a cultivator having rotatable knives or plows so constructed as to be readily adjusted by the driver to cultivate or stir the ground to any desired depth while the machine is in operation; to obtain a cultivator having rotatable knives or plows which can be elevated and thereby entirely removed from the ground when it is desired to draw the cultivator over a field or roadway without cultivating the same—that is, without having such cultivator knives or plows in contact with the ground; and, further, to obtain a sulky-cultivator of the kind named in which the position of the knives or plows can be so adjusted as to vary the direction in which the ground cultivated thereby shall be thrown.

This cultivator is intended for use particularly in a corn-field, and is intended to be drawn by a team of two horses or other animals, such team walking in the space between two rows of corn and the cultivator extending over the row of corn on each side of which the animals forming the team are traveling.

In this machine, as in the machine described in Patent No. 442,350, issued to me on December 9, 1890, for a corn-planter, the frame consists of two principal parts, each of the parts composed of a side bar on one side thereof rigidly secured to a side bar on the other side thereof, the parts pivoted together at the ends of the side bars, the part supported by the wheels pivotally resting on the axle of such wheels, a pole secured to the forward part of the frame between the hounds thereon, and (in order to control the relative position of the two parts of the frame) a crank-shaft extending across the part of the frame supported by the wheels and journaled on the side bars thereof, with a lever secured to the crank-shaft and links connecting the crank-arms of the crank-shaft with arms rigidly secured to the forward part of the frame. Where, as in a rotatable cultivator or a corn-planter, a rotatable shaft regulating and controlling the movement of the knives or plows of the cultivator or the dropper of the corn-planter is necessary, if such rotatable shaft be journaled on the forward part of the frame, as in the patent cited, and such shaft be driven by a chain or belt extending over a wheel on the axle of the rear part of the frame and over a wheel on the shaft, it will be found that the change which the two parts of the frame undergo relative to each other in the adjustment hereinbefore described will so vary the distance between the shaft and the axle—that is, between the sprocket-wheels—that the chain will at times be too slack and at other times too tight to properly work. Such change in the relative position of the sprocket-wheels is objectionable, and a very material object of this invention is to obviate such difficulty.

I have illustrated my invention by the drawings accompanying and forming a part of this specification, in which—

Figure 1 is a longitudinal cross-sectional view of the machine on line 1 1 of Fig. 2; Fig. 2, a plan view of the machine; Fig. 3, an end view thereof; and Fig. 4, a view of the rotary knives I prefer to use, and Fig. 5 an elevation of the two parts of a pivotal hinge used to connect the parts of the sulky-frame together.

A letter of reference applied to a given part is employed to indicate such part where the same appears in the several figures of the drawings.

A is the frame, and $a$ $a'$ are the two principal parts thereof joined together by the pivotal hinge B.

$b$ $b'$ are the two parts of the pivotal hinge B, and $b^2$ is a projecting lug from part $b$, extending into hole $b^3$ on part $b'$.

$b^4$ is a hole through thimble or lug $b^2$ on part $b$, and C is a rotatable shaft extending through the hole $b^4$.

$C'$ $C'$ are journals through which the rotatable shaft C passes, such journals being secured to part $a$ or part $a'$ of the frame, as preferred, and these journals $C'$ $C'$ form supports in line with the journals formed by holes $b^4$ $b^4$ in the pivotal joint B.

D D are the wheels supporting the wheel-frame, and D' is the axle on which they are mounted.

E is a clutch composed of parts $e$ $e'$, part $e$ being rigidly secured to the wheel D, and part $e'$ being mounted on shaft D, and secured by feather or spline $e^2$, so as to rotate therewith, but movable thereon, and $E'$ is the lever by which the clutch E is thrown into gear to produce rotation in axle $D'$ by the turning of the wheel D or out of gear to release such axle from turning, as is desired.

F is a sprocket-wheel rigidly secured to shaft $D'$.

$F'$ is a sprocket-wheel rigidly secured to shaft C.

$f$ is a sprocket-chain passing over wheels F F'. When clutch E is closed by handle $E'$, forward movement of the sulky-frame A rotates shaft $D'$ and wheel F thereon, and by the sprocket-chain $f$ passing thereover and over sprocket-wheel $F'$ the shaft C is rotated.

G G are rotary knives or plows.

$G'$ $G'$ are the shafts on which the knives or plows G G are mounted.

$g$ $g$ are rings adjustably mounted on shafts $G'$ $G'$.

$g'$ $g'$ are arms extending from rings $g$ $g$ outward, and $g^2 g^2$ are staples by which the knives or plows G G are secured to the arms $g'$ $g'$. In order to vary the direction in which the dirt shall be thrown by the knives or plows G G, the rings $g$ $g$ are adjusted by turning them on the shafts $G'$ $G'$, and when turned to the proper position they are rigidly secured by the feathers or splines $g^3$ $g^3$.

$G^2$ $G^2$ are sprocket-wheels on shafts $G'$ $G'$.

$G^3$ is a sprocket-wheel on shaft C.

$g^4$ $g^4$ are sprocket-chains passing over sprocket-wheels $G^2$ and $G^3$. Shafts $G'$ are thus driven by the sprocket-chains $g^4 g^4$ when shaft C is rotated.

H H are the standards in which the shafts $G'$ $G'$ are journaled. Standards H H are secured to the part $a$ of the frame A.

$H'$ is a cross piece or tie extending from one of the side pieces of frame $a$ to the other of such side pieces and also extending on each side beyond the side pieces. The outer ones of the standards H H are secured to part $a$ of the frame A by being attached to the outer ends, respectively, of this cross-piece $H'$.

$H^2$ is a brace or tie extending from the outer end of cross-piece $H'$ forward and inward to the side bar of the part $a$ of the frame.

$H^3$ is a lever or bracket having arms $h$ $h'$ thereon, arm $h$ being secured to cross-piece $h^2$ and arm $h'$ being secured to cross-timber $H'$. Cross-piece $h^2$ extends from the outer standard H inward to the next adjacent standard H.

$H^4$ is a link pivoted to and extending from lever or bracket $H^3$ to the crank-arm $I'$ of crank-shaft I.

$I^2$ is a handle secured to the crank-shaft I, by which the position of the crank-shaft I is determined.

J J are tongue-hounds on the frame A, and $J'$ is the tongue.

K K are wheel scrapers or cleaners secured on beam $k$. Scrapers or cleaners K K are controlled by handle $K'$, such handle being secured on crank-shaft $K^2$ and crank-shaft $K^2$ being connected to scraper-beam $k$ by link $K^3$.

In order to identify part $a$ of frame A, I term such part the "tongue-frame," and in order to identify part $a'$ of such frame A, I term it the "wheel-frame."

Having thus described my invention, what I claim, and desire to secure by Letters Patent of the United States, is—

1. A sulky-frame consisting of two principal parts, a wheel-frame and a tongue-frame, the wheel-frame pivotally resting on the axle thereof and pivotally joined at its forward end to the tongue-frame, a rotatable shaft passing through and journaled in the pivotal hinges joining the wheel-frame to the tongue-frame, a sprocket-wheel secured on the axle of the wheel-frame, a sprocket-wheel secured to the shaft journaled in the pivotal hinges, and a sprocket-chain passing over the sprocket-wheels, whereby rotation of the axle of the wheel-frame will produce rotation of the shaft which is journaled in the pivotal hinges, substantially as described.

2. A sulky-frame consisting of two principal parts, a wheel-frame and a tongue-frame, the wheel-frame pivotally resting on the axle thereof and pivotally joined at its forward end to the tongue-frame, a rotatable shaft passing through and journaled in the pivotal hinges joining the wheel-frame to the tongue-frame, a sprocket-wheel secured on the axle of the wheel-frame, a sprocket-wheel secured to the shaft journaled in the pivotal hinges, and a sprocket-chain passing over the sprocket-wheels, standards extending downward from the tongue-frame, shafts journaled at the lower ends of such standards, a sprocket-wheel and cultivator-knives secured on such shafts, and a sprocket-chain passing over such sprocket-wheels and over sprocket-wheels secured to the shaft journaled in the pivotal hinge, whereby rotation of the axle of the wheel-frame will produce rotation of the cultivator-knives, substantially as described.

3. In field-cultivator knives, the combination of a shaft, rings mounted on the shaft and adapted to be adjusted thereon and secured thereto, arms extending outward from such rings, and blades secured at the ends thereof to the outer ends of such arms, whereby by changing the position of the rings, to the arms of which the blades are secured at one end, the direction in which the earth is thrown by the knives in the rotation thereof is changed, substantially as described.

MATTHEW BURKE.

Witnesses:
FLORA L. BROWN,
LUTE S. ALTER.